(12) United States Patent
Bansal et al.

(10) Patent No.: US 12,356,228 B2
(45) Date of Patent: Jul. 8, 2025

(54) NEXT LEVEL ENHANCEMENTS FOR 5G NR TO IMPROVE UE PERFORMANCE

(71) Applicant: QUALCOMM Incorporated, San Diego, CA (US)

(72) Inventors: Hargovind Prasad Bansal, Hyderabad (IN); Tom Chin, San Diego, CA (US); Rajeev Pal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/643,794

(22) Filed: Dec. 10, 2021

(65) Prior Publication Data

US 2023/0189009 A1 Jun. 15, 2023

(51) Int. Cl.
*H04B 17/336* (2015.01)
*H04B 17/345* (2015.01)
(Continued)

(52) U.S. Cl.
CPC .......... *H04W 24/10* (2013.01); *H04B 17/336* (2015.01); *H04B 17/345* (2015.01); *H04J 11/005* (2013.01); *H04J 11/0066* (2013.01); *H04L 5/0042* (2013.01); *H04L 5/0073* (2013.01); *H04W 16/14* (2013.01); *H04W 36/20* (2013.01); *H04W 72/0453* (2013.01);
(Continued)

(58) Field of Classification Search
CPC ... H04B 7/02–12; H04B 17/0082–3913; H04J 11/0023–0093; H04J 2011/0003–0096; H04L 1/0001–248; H04L 5/0001–26; H04W 8/18–245; H04W 16/02–16; H04W 24/02–10; H04W 28/02–26; H04W 36/0005–385; H04W 48/02–20; H04W 72/02–569; H04W 74/002–008; H04W 76/10–50; H04W 84/02–16; H04W 88/02–12; H04W 92/02–04; H04W 92/10
See application file for complete search history.

(56) References Cited

U.S. PATENT DOCUMENTS

2014/0334330 A1* 11/2014 Baghel .............. H04W 72/1215
2016/0338071 A1* 11/2016 Khosla ............. H04W 72/1215
(Continued)

FOREIGN PATENT DOCUMENTS

WO WO-2021026857 A1 * 2/2021 ........ H04W 72/1215

*Primary Examiner* — Timothy J Weidner
(74) *Attorney, Agent, or Firm* — Paul M. McAdams; Polsinelli LLP

(57) ABSTRACT

A UE may transmit to a base station, and the base station may receive from the UE, via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. The base station may identify at least one interference mitigation measure based on the IDC interference indication. The UE and the base station may communicate based on the at least one interference mitigation measure.

26 Claims, 11 Drawing Sheets

(51) Int. Cl.
    *H04J 11/00*         (2006.01)
    *H04L 5/00*          (2006.01)
    *H04W 16/14*        (2009.01)
    *H04W 24/10*        (2009.01)
    *H04W 36/20*        (2009.01)
    *H04W 72/0453*      (2023.01)
    *H04W 72/20*        (2023.01)
    *H04W 72/541*       (2023.01)
    *H04W 76/20*        (2018.01)
    *H04W 84/02*        (2009.01)
    *H04W 88/02*        (2009.01)
    *H04W 88/08*        (2009.01)
    *H04W 92/02*        (2009.01)
    *H04W 92/10*        (2009.01)

(52) U.S. Cl.
    CPC ......... *H04W 72/20* (2023.01); *H04W 72/541* (2023.01); *H04W 76/20* (2018.02); *H04W 84/02* (2013.01); *H04W 88/02* (2013.01); *H04W 88/08* (2013.01); *H04W 92/02* (2013.01); *H04W 92/10* (2013.01)

(56) References Cited

U.S. PATENT DOCUMENTS

| | | | |
|---|---|---|---|
| 2020/0106674 A1* | 4/2020 | Van Der Velde | H04W 72/0453 |
| 2022/0022143 A1* | 1/2022 | Ding | H04W 72/1215 |
| 2022/0329279 A1* | 10/2022 | Mukherjee | H04W 72/1215 |
| 2022/0346109 A1* | 10/2022 | Cheng | H04W 72/1215 |

* cited by examiner

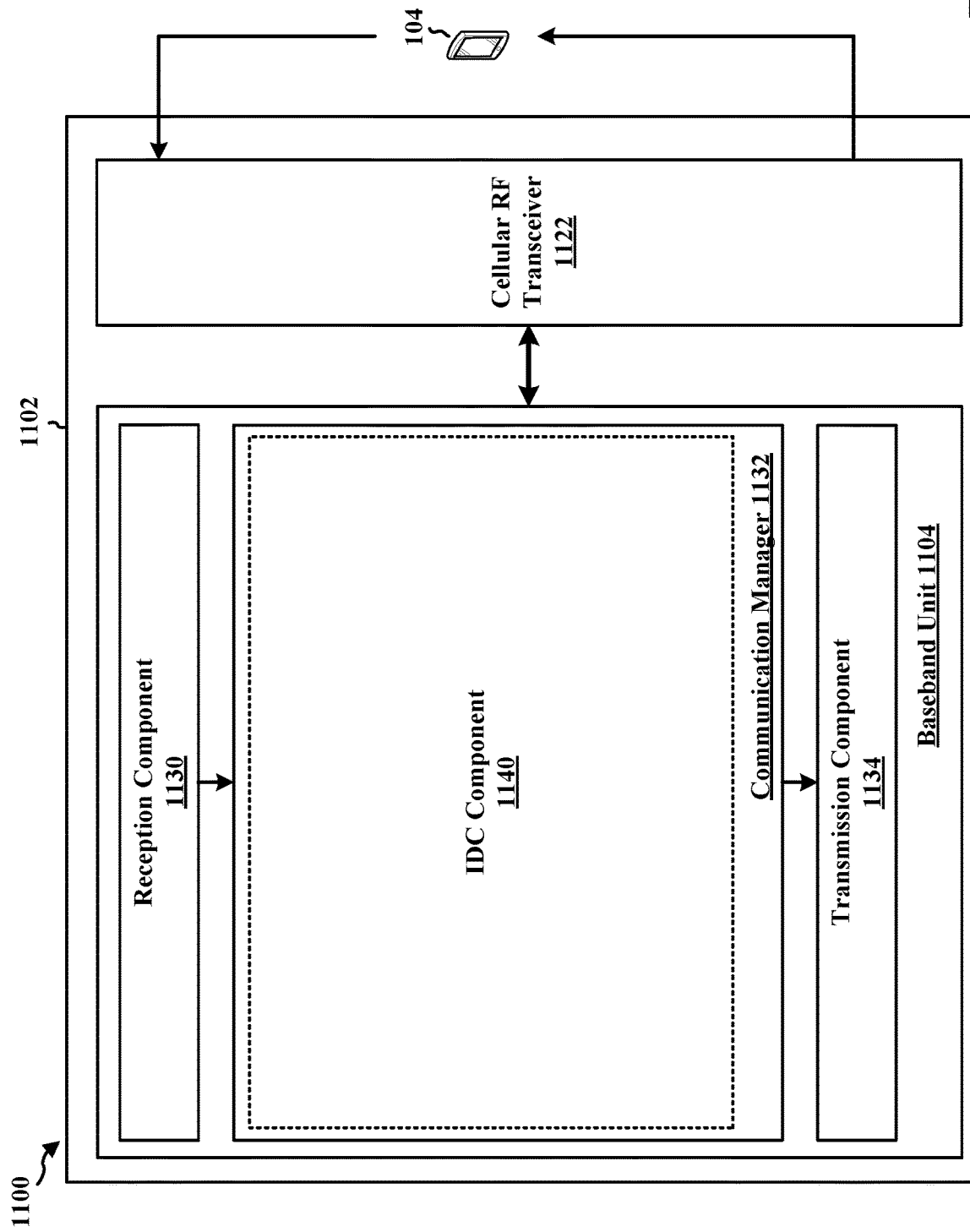

NEXT LEVEL ENHANCEMENTS FOR 5G NR TO IMPROVE UE PERFORMANCE

TECHNICAL FIELD

The present disclosure relates generally to communication systems, and more particularly, to network-assisted mitigation in UE self-interference.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may transmit, to a base station via a radio resource control (RRC) message, an in-device coexistence (IDC) interference indication. The IDC interference indication may be associated with at least one victim reception or at least one aggressor transmission. The IDC interference indication may include at least one of a first frequency range associated with the at least one victim reception, information associated with the at least one aggressor transmission, a first requested bandwidth part (BWP) associated with the at least one victim reception, or a second requested BWP associated with the at least one aggressor transmission. The apparatus may communicate with the base station based on at least one interference mitigation measure associated with the base station. The at least one interference mitigation measure may be based on the IDC interference indication.

In an aspect of the disclosure, a method, a computer-readable medium, and an apparatus are provided. The apparatus may be a base station. The apparatus may receive, from a UE via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. The apparatus may identify at least one interference mitigation measure based on the IDC interference indication. The apparatus may communicate with the UE based on the at least one interference mitigation measure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a diagram illustrating an example of a hardware implementation for an example apparatus.

DETAILED DESCRIPTION

Figure 1:
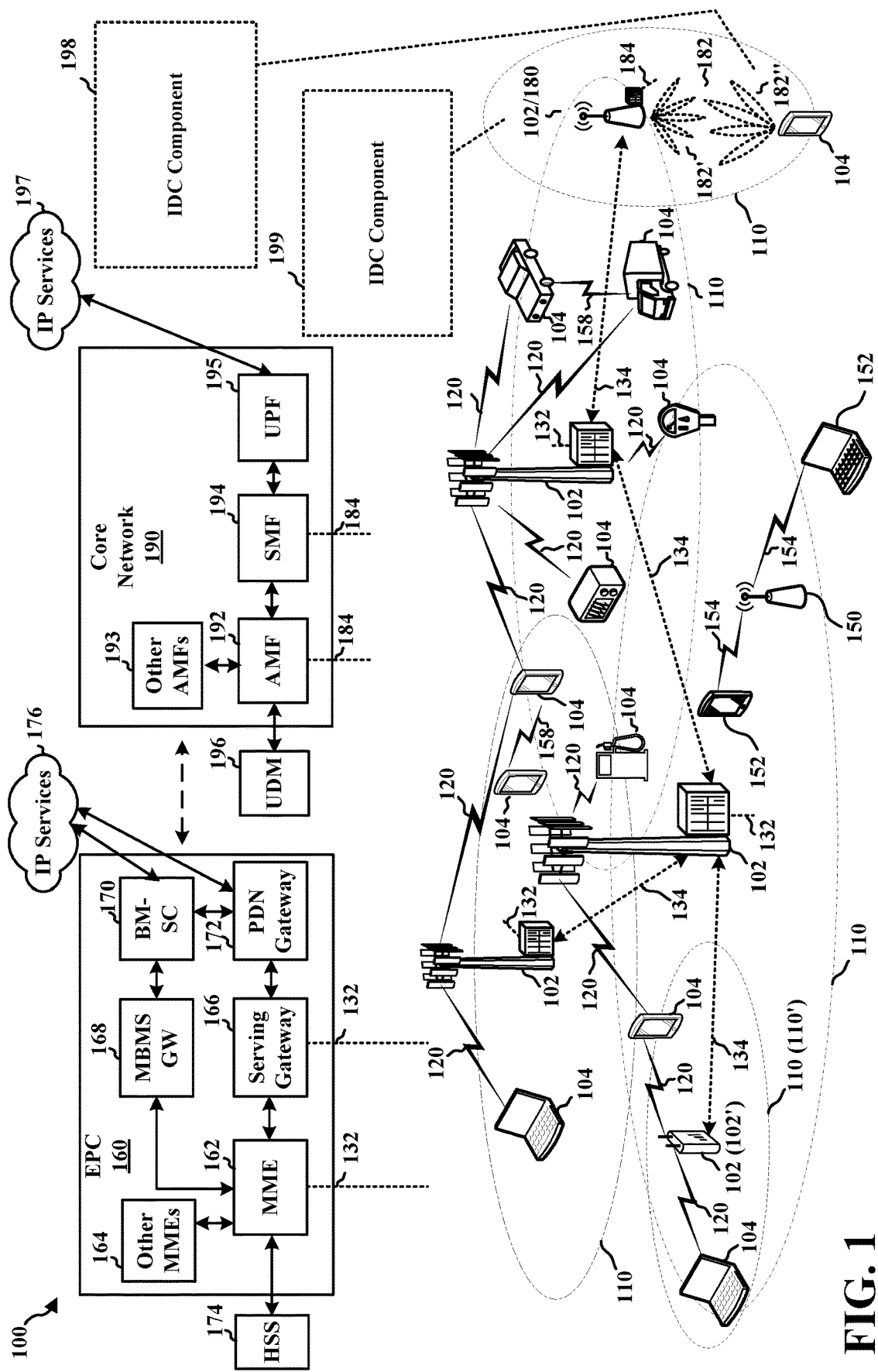
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an IDC component 198 that may be configured to transmit, to a base station via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. The IDC component 198 may be configured to communicate with the base station based on at least one interference mitigation measure associated with the base station. The at least one interference mitigation measure may be based on the IDC interference indication. In certain aspects, the base station 180 may include an IDC component 199 that may be configured to receive, from a UE via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. The IDC component 199 may be configured to identify at least one interference mitigation measure based on the IDC interference indication. The IDC component 199 may be configured to communicate with the UE based on the at least one interference mitigation measure. Although the following description may be focused on 5G NR, the concepts described herein may be applicable to other similar areas, such as LTE, LTE-A, CDMA, GSM, and other wireless technologies.

Figure 2:
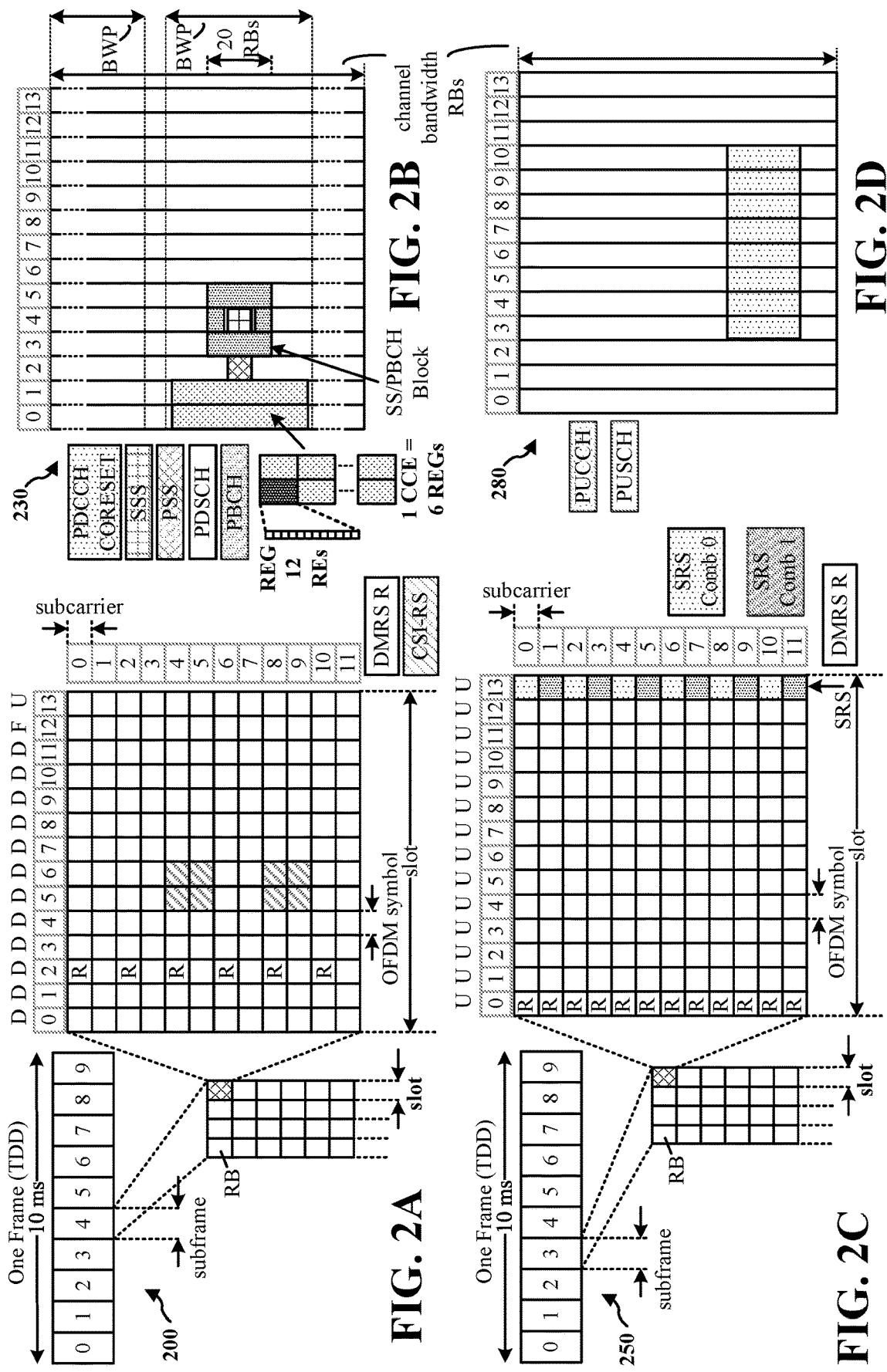
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
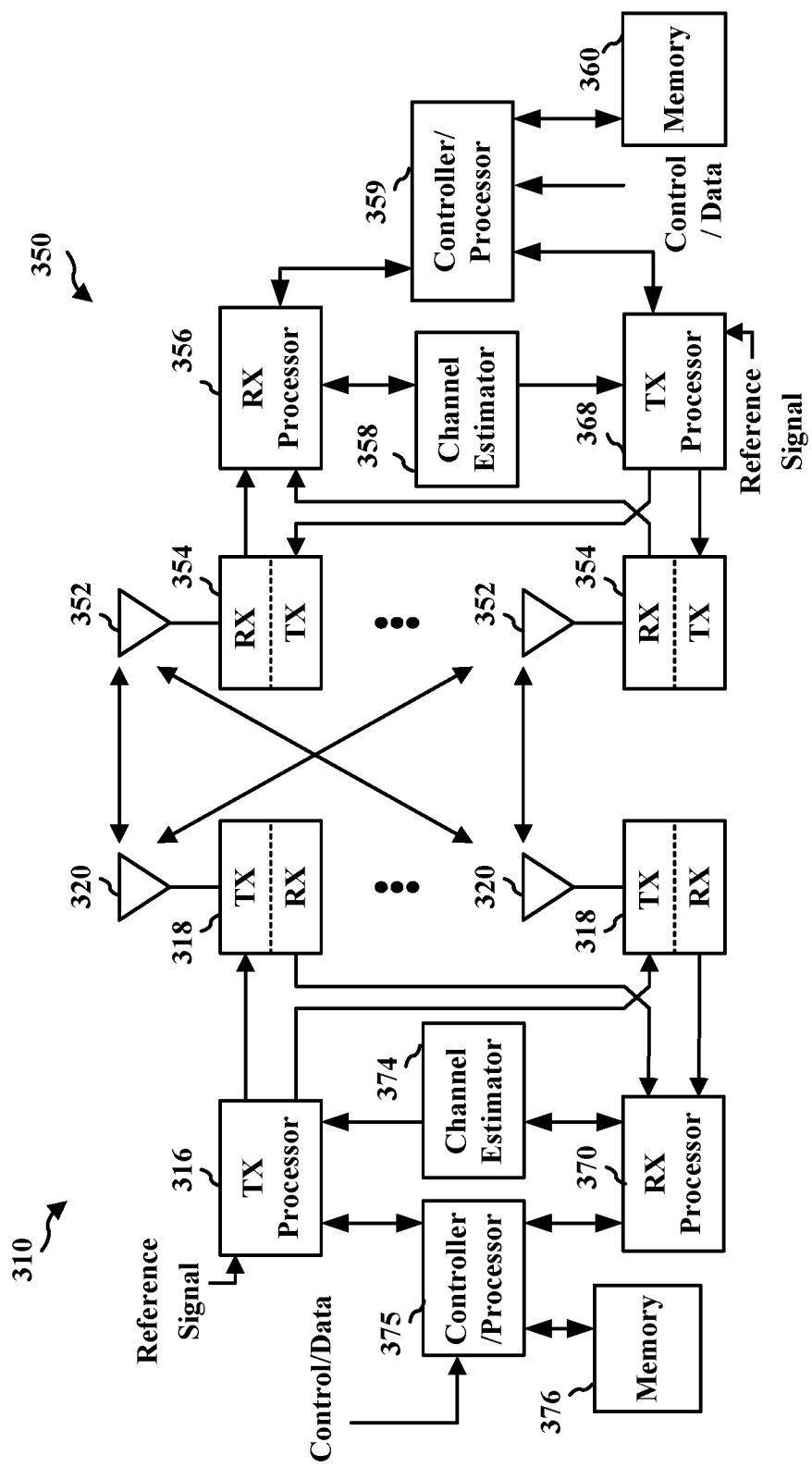
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
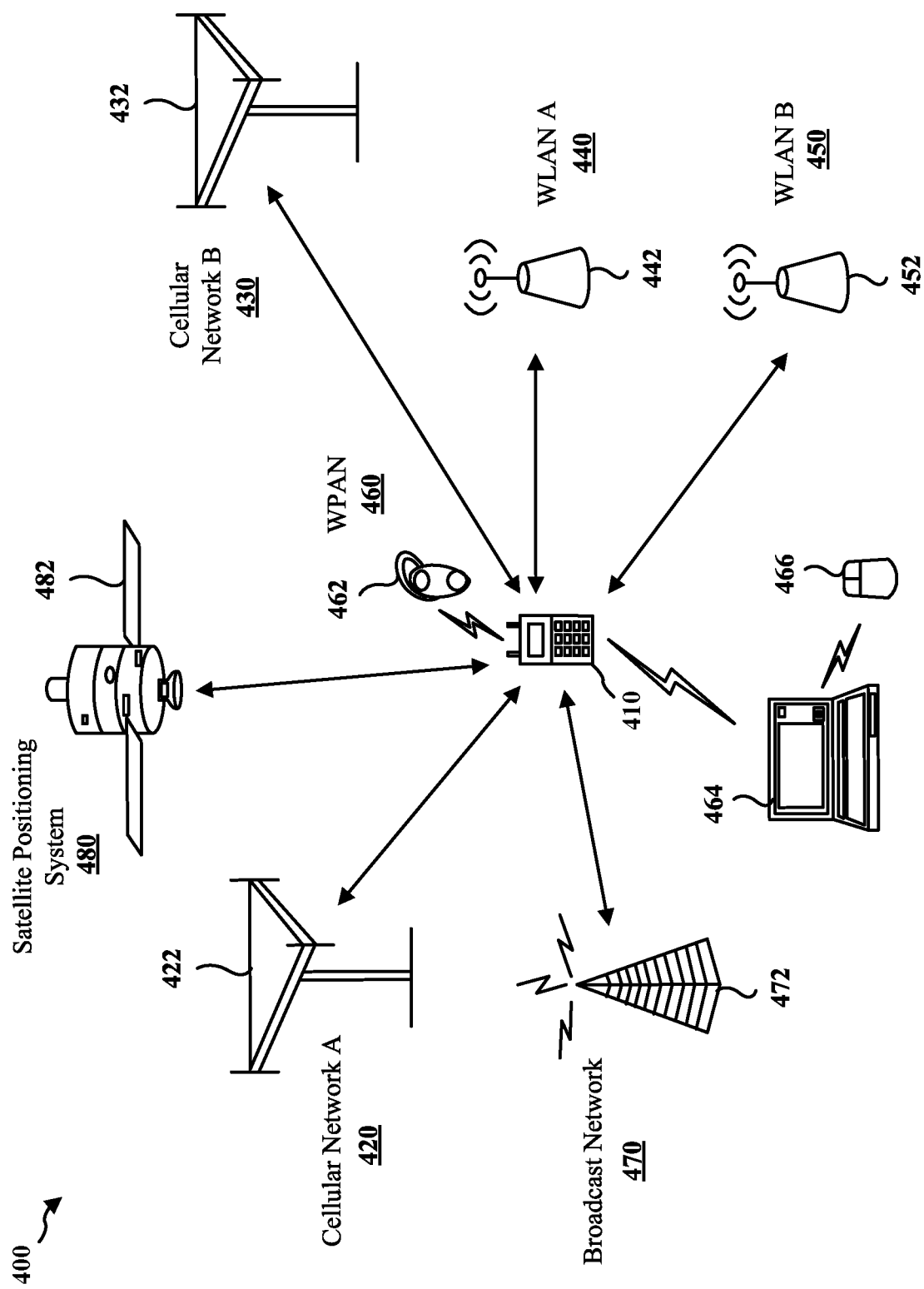
FIG. 4 illustrates an exemplary wireless communication environment in which various aspects and embodiments described herein can function.

FIG. 4 illustrates an exemplary wireless communication environment 400 in which various aspects and embodiments described herein can function. In various embodiments, the wireless communication environment 400 shown in FIG. 4 can include a wireless device 410, which can have capabilities to communicate with multiple communication systems. For example, the wireless device 410 may have capabilities that support communication with one or more cellular networks 420 and/or 430, one or more wireless local area networks (WLANs) 440 and/or 450, a wireless personal area network (WPAN) 460, one or more broadcast networks 470, one or more satellite positioning systems 480, other systems and/or networks not shown in FIG. 4, or any combination thereof, wherein the terms "network" and "system" may be used interchangeably in the following description.

In various embodiments, the cellular networks 420 and 430 can each be a CDMA, TDMA, FDMA, OFDMA, single carrier FDMA (SC-FDMA), or another suitable network. A CDMA network can implement a RAT such as universal terrestrial radio access (UTRA), CDMA2000, etc. UTRA includes wideband CDMA (WCDMA) and other variants of CDMA. Moreover, CDMA2000 covers IS-2000 (CDMA2000 1x), IS-95 and IS-856 (HRPD) standards. A TDMA network can implement a RAT such as global system for mobile communications (GSM), digital advanced mobile phone system (D-AMPS), etc. An OFDMA network can implement a RAT such as evolved UTRA (E-UTRA), 5G NR, ultra mobile broadband (UMB), IEEE 802.16 (WiMAX), IEEE 802.20, Flash-OFDM, etc. UTRA and E-UTRA are part of universal mobile telecommunication system (UMTS). 3GPP LTE and LTE-Advanced (LTE-A) are releases of UMTS that use E-UTRA. 3GPP 5G NR is a more recent RAT from 3GPP. UTRA, E-UTRA, UMTS, LTE, LTE-A, 5G NR, and GSM are described in documents from an organization named 3GPP. CDMA2000 and UMB are described in documents from an organization named "3rd Generation Partnership Project 2" (3GPP2). In an aspect, the cellular network 420 can include a number of base stations 422, which can support bi-directional communication for wireless devices within their coverage. Similarly, the cellular network 430 can include a number of base stations 432 that can support bi-directional communication for wireless devices within their coverage.

WLANs 440 and 450 can respectively implement RATs such as IEEE 802.11 (Wi-Fi), Hiperlan, etc. The WLAN 440 can include one or more access points 442 that can support bi-directional communication. Similarly, the WLAN 450 can include one or more access points 452 that can support bi-directional communication. The WPAN 460 can implement a RAT such as Bluetooth (BT), Bluetooth Low Energy (BTLE), IEEE 802.15, etc. Further, the WPAN 460 can support bi-directional communication for various devices such as wireless device 410, a headset 462, a computer 464, a mouse 466, or the like.

The broadcast network 470 can be a television (TV) broadcast network, a frequency modulation (FM) broadcast network, a digital broadcast network, etc. A digital broadcast network can implement a RAT such as MediaFLO, digital video broadcasting for handhelds (DVB-H), integrated services digital broadcasting for terrestrial television broadcasting (ISDB-T), or the like. Further, the broadcast network 470 can include one or more broadcast stations 472 that can support one-way communication.

The satellite positioning system 480 can be the United States Global Positioning System (GPS), the European Galileo system, the Russian GLONASS system, the quasi-zenith satellite system (QZSS) over Japan, the Indian Regional Navigational Satellite System (IRNSS) over India, the Beidou system over China, and/or any other suitable system. Further, the satellite positioning system 480 can include a number of satellites 482 that transmit signals for position determination.

In various embodiments, the wireless device 410 can be stationary or mobile and can also be referred to as a client device, UE, user terminal, user device, communication device, wireless communications device, handheld device, mobile device, mobile terminal, mobile station, handset, access terminal, subscriber device, subscriber terminal, subscriber station, terminal, and/or variants thereof, which are used interchangeably to refer to any suitable mobile or stationary device that may operate that can communicate with a RAN that implements a particular RAT, over a wired network, over a Wi-Fi network (e.g., based on IEEE 802.11, etc.), and/or with other devices via direct D2D and/or peer-to-peer (P2P) signaling protocols (e.g., LTE Direct, sometimes referred to as LTE Advanced, AllJoyn, Wi-Fi Direct, Wi-Fi Aware, Bluetooth, BTLE, near-field communication (NFC), etc.). For example, according to the various aspects and embodiments described herein, the wireless device 410 may discover the other devices via the D2D and/or P2P signaling protocols according to various methods, including technical specifications set forth by the 3GPP, the Wi-Fi Alliance, etc. As such, the wireless device 410 can generally engage in two-way communication with the cellular system 420 and/or 430, the WLAN system 440 and/or 450, devices with the WPAN system 460, and/or any other suitable systems(s) and/or devices(s). The wireless device 410 can additionally or alternatively receive signals from the broadcast system 470 and/or satellite positioning system 480. In general, those skilled in the art will appreciate that the wireless device 410 can communicate with any number of systems and/or networks at any given moment, which may also cause the wireless device 410 to experience coexistence issues among various constituent radio devices associated therewith that may operate at the same time. Accordingly, as will be explained in further detail herein, the wireless device 410 may include a coexistence manager (CxM, not shown) having one or more functional modules to detect and mitigate coexistence issues.

In particular, as will be explained in further detail herein, the terms "coexistence state," "coexistence impacts," "coexistence parameters," and/or variants thereof as used herein may generally represent the level of impact, including desense (e.g., lost sensitivity due to noise sources), for the radios on a given device and may include one or more inputs such as the operational radios, respective parameters associated with the operational radios such as TX power level, operating frequencies, receiver sensitivities, throughput, timing, use cases, etc. Furthermore, according to various aspects, the terms "coexistence state," "coexistence impacts," "coexistence parameters," or the like as used herein may comprise secondary effects that can include temperature, process, and operational effects such as manufacturer filer variations, component aging, isolation variations (e.g., hand/object placement, channel conditions, etc.). As such, based on the above-mentioned information and/or other relevant factors, the impacts to one or more receive radios can be determined. Furthermore, according to the various aspects and embodiments described herein, the coexistence state for a given device may be stored in a database, a lookup table, a memory, and/or any other suitable repository or data source accessible to the local device and represent all radios built into that device. In various embodiments, a manufacturer associated with the device may pre-populate the database, lookup table, memory, etc. at build time, or the database, lookup table, memory, etc. may alternatively (or additionally) be created and/or updated during operations. Furthermore, according to various aspects, the coexistence state, impacts, parameters, etc. may be shared with one or more adjacent devices or other proximally located devices for the purposes described herein.

In-device coexistence (IDC) may be a feature usable for self-interference mitigation between two or more radios (e.g., between cellular network radios, or between a cellular network radio and a satellite positioning system receiver, etc.) co-existing in a UE. IDC may be useful in scenarios where the UE may not be able to mitigate the interference on its own, and may seek assistance from the network. Herein when a transmission from a transmitter in a UE is causing interference to reception at a receiver in the same UE (e.g., due to hardware sharing), the transmission and the transmitter may be referred to as the aggressor transmission and the aggressor transmitter, respectively, and the reception and the receiver may be referred to the victim (impacted, affected) reception and the victim (impacted, affected) receiver, respectively. One or both the aggressor transmission or the victim reception may correspond to a transmission or a reception in a cellular wireless communication system. The aggressor transmission may be associated with an aggressor carrier band or frequency range. The victim reception may be associated with a victim (impacted, affected) carrier band or frequency range.

For example, if a UE is configured by base station with the information element (IE) 'idc-Config,' the UE may report to the base station, via an IDC indication message in an RRC message, a list of channel frequencies (e.g., carrier bands) affected by the interference, a time domain pattern to indicate the HARQs most affected by the interference, a direction of interference, or a cause of interference (e.g., hardware sharing etc.). Neighbor cells configured at a UE may correspond to victim channels affected directly or indirectly by other active transmissions (e.g., due to intermodulation, etc.). The interference may become more severe when the increased-UE-carrier-monitoring (IncMon) feature is enabled as more non-guaranteed bit rate (NGBR) carriers are added. Accordingly, the UE may report information relating to the interference to the base station via an IDC indication message. Herein a reference to the network may include a reference to the base station in a cellular wireless communication system.

In response to receiving the IDC indication, the network (e.g., a RAN, which may include a base station) may use the information contained therein to mitigate or limit the interference through any of a number of measures. Such measures may include, for example, a discontinuous RX (DRX) cycle change, a change in the grant, an inter-frequency (IF) handover, or selection of an appropriate secondary cell (SCell).

However, as the carrier bandwidth increases in more recent technologies (for example, in 5G NR, the maximum bandwidth may be 100 MHz in FR1, and 400 MHz in FR2), the network may not be able to efficiently assist with IDC self-interference mitigation when the network receives simply a list of carrier bands affected by the interference. The inefficiency may become more pronounced as the carrier bandwidth continues to increase with the introduction of later technologies.

One or more aspects of the disclosure may relate to enhancements to the IDC mechanism, taking into account more recent developments in cellular communication technologies (e.g., higher bandwidths, use of higher order carrier aggregation, use of the BWP, or non-linear inference cancellation (NLIC) availability and changes, etc.)

As described above, with the increasing carrier bandwidth, simply specifying by the UE the impacted carrier frequencies suffering from internal self-interference (e.g., the victim carrier bands) in an IDC indication message may not be useful or sufficient, because the network may not be able to identify the exact RBs that are affected by the interference at the victim receiver. Further, the UE may implement such features as fast frequency hopping (FFH) or offset zero intermediate frequency (ZIF) (OZIF). When such features are enabled, the frequency of the RF local oscillator (LO) may change, and the impacted range of frequencies within the active carrier band may change accordingly.

In one configuration, the UE may indicate, in an IDC indication, a frequency range associated with the victim reception. In particular, the UE may specify, in the IDC indication, a start frequency and a stop frequency defining the frequency range within the active carrier that is affected by the interference. In one configuration, the specifications of the start and stop frequencies may be in terms of absolute frequencies (e.g., NR frequencies). In another configuration, the specifications of the start and stop frequencies may be in terms of offsets from a predefined frequency, or from the frequency corresponding to the nearest absolute RF channel number (ARFCN) or global synchronization channel number (GSCN).

In one configuration, the UE may include, in the IDC indication, an IE indicating the victim mode associated with the victim reception. The victim mode may be one of, for example, an active voice call mode, a connected mode, an idle mode, an IF mode (e.g., Frequency 1 and Frequency 2), an IF neighbor mode (e.g., Neighbor Frequency 1 and Neighbor Frequency 2), or an inter-RAT mode (e.g., an LTE RAT and an NR RAT). Accordingly, the victim mode may signify the mode associated with the victim frequency range.

The indication about the victim frequency range and/or the victim mode may better help the network to understand the exact range of the impacted frequencies within the whole carrier bandwidth. The network may implement interference mitigation measures accordingly. For example, the network may allocate RBs outside the impacted frequency range to the victim receiver. In one configuration, the network may not reconfigure a different carrier frequency for the victim receiver.

In one configuration, based on the impacted frequency ranges at the victim receiver, the network may activate a BWP in the carrier band that does not contain the impacted frequency range. In another configuration, based on a time division multiplexing (TDM) pattern, the network may implement a BWP switching procedure, where the BWP associated with the victim receiver may be switched based on a pattern in order to minimize the interference at the victim receiver.

In one configuration, the UE may indicate, in the IDC indication, a priority associated with each victim reception. The priorities may signify how the UE prioritizes interference mitigation associated with the various victim receptions at various carrier bands or frequency ranges. Accordingly, the victim receptions may be ordered based on the priorities in the IDC indication. The UE may use any of a number of metrics in evaluating the priority associated with a victim reception at a carrier band or a frequency range. The metrics may include, for example, an amount of interference (e.g., an estimated degradation in the signal-to-noise ratio (SNR) due to the interference), a throughput (e.g., an estimated layer 2 (L2) throughput based on the network grant and channel conditions), or a victim mode (e.g., an active voice call mode, a connected mode, an idle mode, an IF mode, an IF neighbor, or an inter-RAT mode). In different examples, the UE may prioritize interference mitigation associated with a victim reception suffering from a high level of interference or a low throughput due to the interference, or a victim reception associated with an active voice call or a connected mode, and so on.

In one configuration, the UE may indicate, in the IDC indication, aggressor information in relation to (e.g., paired with) a victim reception. The victim reception may be impacted by self-interference caused by the aggressor transmission due to, e.g., UE hardware sharing. In one configuration, the UE may indicate, in the IDC indication, a frequency range associated with the aggressor transmission causing the interference, where the frequency range may be associated with the interference. The UE may indicate the frequency range associated with the aggressor transmission in addition to indicating the frequency range associated with the victim reception, as described above.

The indication of the frequency range associated with the aggressor transmission may provide the network with additional flexibility to change parameters associated with the aggressor transmission in order to mitigate or minimize the interference. In one configuration, to mitigate or eliminate the interference caused by the aggressor transmission to the victim reception, the network may switch the BWP associated with the aggressor transmission such that the new BWP may be outside the frequency range associated with the interference. In one configuration, the network may add a supplemental uplink (SUL) to the aggressor transmission, where transmissions based on the SUL may not cause interference to the victim reception. In one configuration, the network may allocate RBs associated with the aggressor transmission, such that based on the new RBs, the UE may retune the RF LO frequency and the baseband filter (BBF) and accordingly, the aggressor transmission may no longer cause interference to the victim reception. With the use of the BWPs, the UE may be directed by the network to use (e.g., tune to) one BWP chosen by the network out of a number of possible BWPs (e.g., 4 possible BWPs). BWP switching may be initiated by the network through an RRC configuration message, a DCI message, or a timer. Use of the BWPs may help the UE to save power.

In one configuration, the UE may check the multiple configured BWPs in the carrier band associated with the victim reception that is experiencing self-interference. Because the different BWPs may be spread across a wide carrier bandwidth, the UE may identify one or more BWPs that are not impacted or not as impacted by the interference. Accordingly, the UE may include, in the IDC indication, an IE indicating one or more preferred BWPs associated with the victim reception. The preferred BWPs may be associated with no or less interference (e.g., the least interference) for the victim frequency range or carrier band.

Therefore, the network may take into account the UE's BWP preference along with other factors when initiating a BWP switch. In one configuration, based on an interference TDM pattern shared between the UE and the network, the network may implement a BWP switching process according to a TDM pattern so as to mitigate or limit the average interference caused to the victim reception. For example, if on the first BWP, the aggressor transmission and the victim reception are both associated with an (UL, DL, UL, DL) TDM frame pattern, and if on the second BWP, the aggressor transmission is associated with an (UL, DL, UL, DL) TDM frame pattern and the victim reception is associated with a (DL, UL, DL, UL) TDM frame pattern, the network may implement a BWP switch from the first BWP to the second BWP in order to mitigate or limit the average interference caused to the victim reception.

In one configuration, the UE may indicate, in the IDC indication, one or more preferred BWPs associated with the aggressor transmission or carrier band. The indication of the preferred BWPs associated with the aggressor transmission may be in addition to or in lieu of the indication of the preferred BWPs associated with the victim reception. The indication of the preferred BWPs associated with the aggressor transmission may be especially useful in partial TX overlap scenarios (e.g., there may be a partial overlap in frequency between the allocated RBs in the uplink and the downlink bandwidth), where changing the BWP of the aggressor transmission or carrier band may help to mitigate the self-interference.

Figure 5:
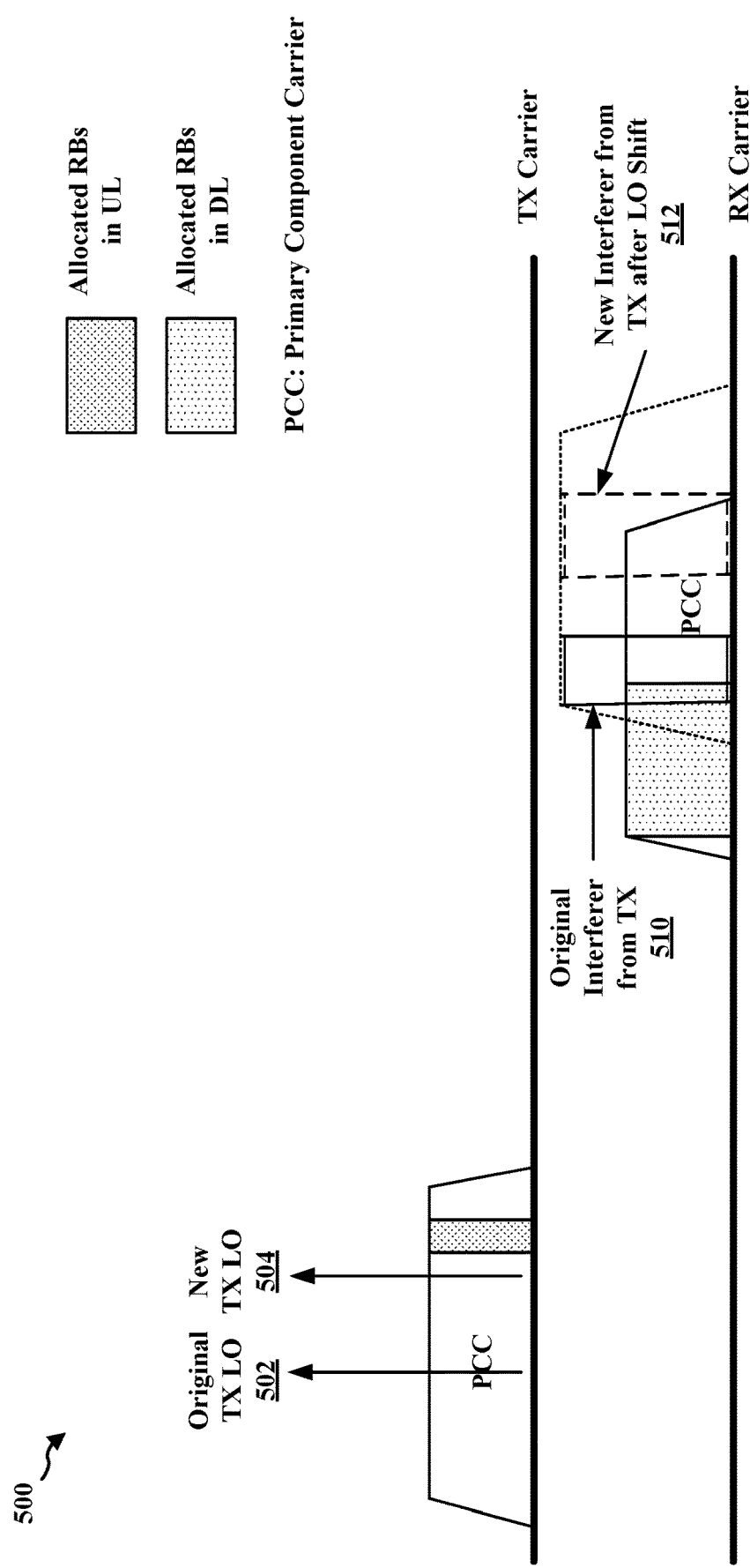
FIG. 5 is a diagram illustrating an example scenario involving a partial overlap in frequency between the allocated RBs in the uplink and the downlink bandwidth.

FIG. 5 is a diagram 500 illustrating an example scenario involving a partial overlap in frequency between the allocated RBs in the uplink and the downlink bandwidth. With partial RB allocation overlap in the uplink (e.g., the uplink may be associated with an allocation of a few RBs that are common in frequency with an allocation of RBs for the downlink), which may be associated with an aggressor transmission, there may be a partial overlap in frequency between the allocated RBs in the uplink and the downlink bandwidth, which may be associated with a victim reception. Based on the IDC indication received from the UE, the network may allocate different RBs in the uplink, or may switch the uplink BWP, in an effort to assist the UE in mitigating self-interference, as described above. Based on the new uplink RB allocation or the new uplink BWP, the interference waveform may be shifted such that the interference to the downlink reception may be reduced or mitigated. In particular, the UE may apply FFH on the uplink to shift the LO frequency to the center of the allocated uplink RBs. One drawback associated with this approach may be that the center subcarrier may be notched out in the uplink, leading to an increase in uplink block error rate (BLER). Accordingly, this approach may be applied on the PUSCH but not the PUCCH. For the PUCCH, the UE may move the LO frequency (e.g., from 502 to 504), such that the LO frequency does not fall on any of the allocated RBs and the interference is moved away from the allocated RBs in the downlink (e.g., the interferer may be moved from 510 to 512, that is, away from the allocated downlink RBs). Satisfactory performance in both the uplink and the downlink may be achieved.

Based on the additional information provided to the network in the IDC indication, the network may, on a best effort basis, assist the UE in mitigating the self-interference. Due to other constraints or considerations of the network scheduler, such as load balancing, fair scheduling, or maximal scheduling, etc., the network may not be able to assist the UE in mitigating all self-interference associated with all the victim carrier bands, frequency ranges, or receptions.

The UE may be equipped with NLIC capability, which may be a hardware-based self-interference mitigation mechanism. Because NLIC may be associated with additional costs in hardware, bill of materials (BOM), or hardware processing cycles (which may be measured in, e.g., million instructions per second (MIPS), NLIC blocks in the modem may be a limited resource, and may not be sufficient to mitigate interference across all possible carrier bands or frequency ranges in multi-carrier, carrier aggregation, and/or E-UTRA NR dual connectivity (ENDC) scenarios. Therefore, the NLIC resources may be selectively applied to victim carrier bands or frequency ranges based on priorities associated with the carrier bands or frequency ranges. The priorities may be based on, e.g., a MIMO order, a throughput contribution, or a use scenario (e.g., a voice call), etc. The particular priorities may be implementation specific or may be based on user specification. However, without taking into account the network-provided assistance in self-interference mitigation, the NLIC resources may be blindly wasted on the highest priority victim carrier bands or frequency ranges for which the network-provided assistance in self-interference mitigation may have been available and sufficient.

Therefore, in one configuration, the UE may indicate to the network, in the IDC indication, the list of victim carrier bands or frequency ranges. The victim carrier bands or frequency ranges may be associated with priorities, as described above, and the list may be ordered based on the priorities. The UE may then, potentially after a preconfigured delay, identify those victim carrier bands or frequency ranges for which the network-provided assistance in self-interference mitigation may be available and sufficient. Once the assistance provided by the network is identified, the UE may apply the NLIC for interference mitigation to the remaining victim carrier bands or frequency ranges for which the network-provided assistance may be unavailable or insufficient. The NLIC may be applied to the remaining victim carrier bands or frequency ranges in the order of priority. Therefore, from the perspective of the UE, the network-provided assistance in self-interference mitigation and the NLIC may be jointly planned and applied to maximize the number of victim carrier bands or frequency ranges that may benefit from interference mitigation or cancellation.

Figure 6:
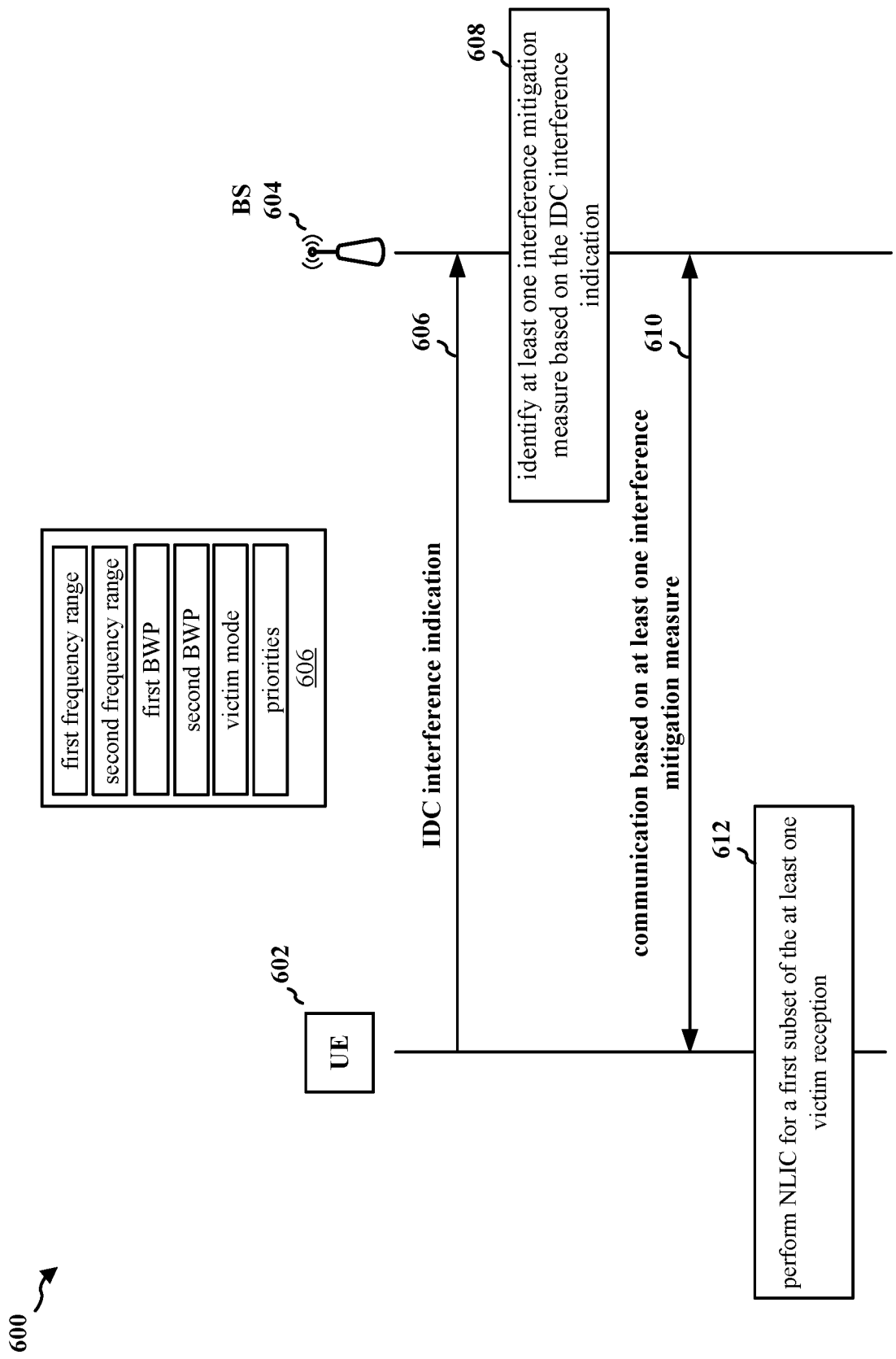
FIG. 6 is a diagram of a communication flow of a method of wireless communication.

FIG. 6 is a diagram of a communication flow 600 of a method of wireless communication. At 606, UE 602 may transmit, to a base station 604, and the base station 604 may receive, from the UE 602, via an RRC message, an IDC interference indication. The IDC interference indication may be associated with a UE assistance message. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission.

In one configuration, the at least one victim reception and the at least one aggressor transmission may be associated with a same RAT. In one configuration, the at least one victim reception and the at least one aggressor transmission may be associated with different RATs.

In one configuration, the IDC interference indication 606 may include the first frequency range associated with the at least one victim reception. The first frequency range may correspond to a start frequency and an end frequency. In one configuration, the start frequency or the end frequency may include an absolute frequency or a frequency offset.

In one configuration, the IDC interference indication 606 may further include a victim mode associated with the at least one victim reception. In one configuration, the victim mode may correspond to an active voice call mode, a connected mode, an idle mode, an IF mode, an IF neighbor mode, or an inter-RAT mode.

In one configuration, the IDC interference indication 606 may further include a priority associated with each victim reception in the at least one victim reception. In one configuration, the priority associated with each victim reception in the at least one victim reception may be based on at least one of a level of interference, a throughput, or a victim mode.

In one configuration, the IDC interference indication 606 may include the information associated with the at least one aggressor transmission. The information associated with the at least one aggressor transmission may include a second frequency range associated with the at least one aggressor transmission. In one configuration, the second frequency range may correspond to a start frequency and an end frequency.

At 608, the base station 604 may identify at least one interference mitigation measure based on the IDC interference indication 606.

In one configuration, the at least one interference mitigation measure may include at least one of a first RB allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based at least on a first pattern (e.g., a TDM pattern associated with the victim reception or the aggressor transmission), second BWP switching associated with the at least one aggressor transmission based at least on a second pattern (e.g., a TDM pattern associated with the aggressor transmission or the victim reception), or an addition of a supplemental uplink associated with the at least one aggressor transmission.

At 610, the UE 602 and the base station 604 may communicate with each other based on the at least one interference mitigation measure.

At 612, the UE 602 may perform NLIC for a first subset of the at least one victim reception. The at least one interference mitigation measure associated with the base station 604 may correspond to a second subset of the at least one victim reception. The first subset of the at least one victim reception may be associated with one or more lower priorities than one or more victim receptions in the second subset of the at least one victim reception.

Figure 7:
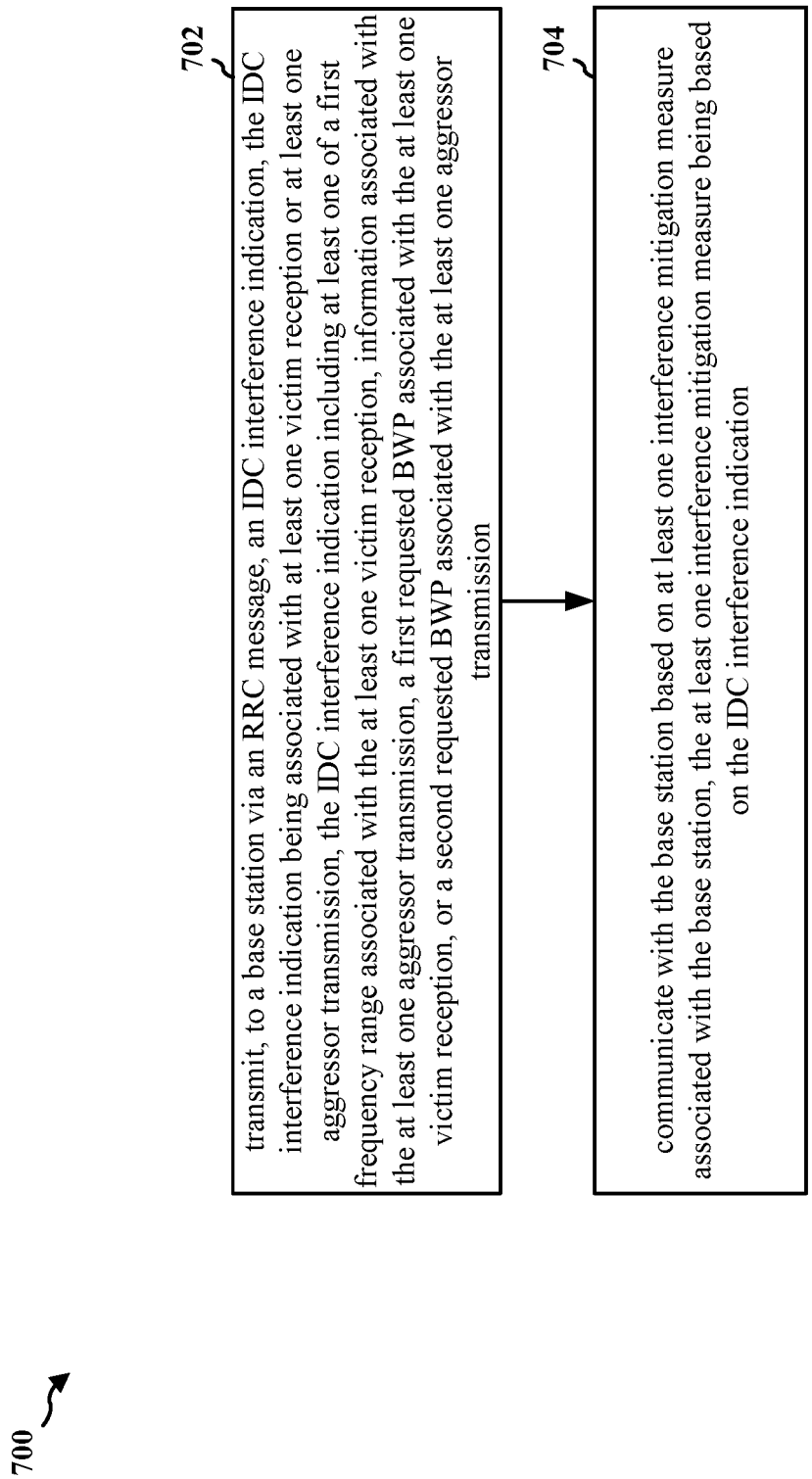
FIG. 7 is a flowchart of a method of wireless communication.

FIG. 7 is a flowchart 700 of a method of wireless communication. The method may be performed by a UE (e.g., the UE 104/350/602; the apparatus 1002). At 702, the UE may transmit, to a base station via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. For example, 702 may be performed by the IDC component 1040 in FIG. 10. Referring to FIG. 6, at 606, the UE 602 may transmit, to a base station 604 via an RRC message, an IDC interference indication.

At 704, the UE may communicate with the base station based on at least one interference mitigation measure associated with the base station. The at least one interference mitigation measure may be based on the IDC interference indication. For example, 704 may be performed by the IDC component 1040 in FIG. 10. Referring to FIG. 6, at 610, the UE 602 may communicate with the base station 604 based on at least one interference mitigation measure associated with the base station 604.

Figure 8:
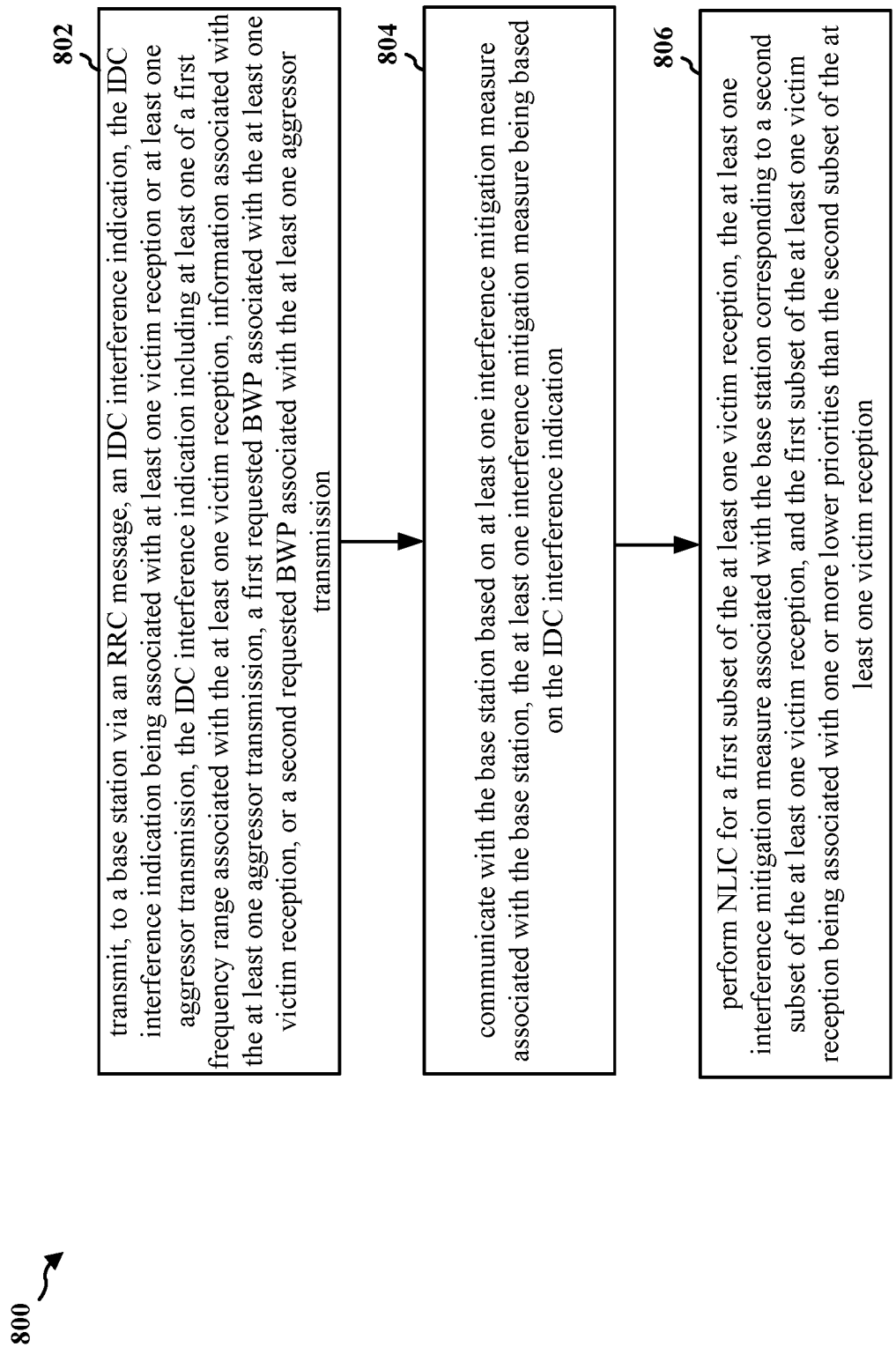
FIG. 8 is a flowchart of a method of wireless communication.

FIG. 8 is a flowchart 800 of a method of wireless communication. The method may be performed by a UE (e.g., the UE 104/350/602; the apparatus 1002). At 802, the UE may transmit, to a base station via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. For example, 802 may be performed by the IDC component 1040 in FIG. 10. Referring to FIG. 6, at 606, the UE 602 may transmit, to a base station 604 via an RRC message, an IDC interference indication.

At 804, the UE may communicate with the base station based on at least one interference mitigation measure associated with the base station. The at least one interference mitigation measure may be based on the IDC interference indication. For example, 804 may be performed by the IDC component 1040 in FIG. 10. Referring to FIG. 6, at 610, the UE 602 may communicate with the base station 604 based on at least one interference mitigation measure associated with the base station 604.

In one configuration, the at least one victim reception and the at least one aggressor transmission may be associated with a same RAT.

In one configuration, the at least one victim reception and the at least one aggressor transmission may be associated with different RATs.

In one configuration, referring to FIG. 6, the IDC interference indication 606 may include the first frequency range associated with the at least one victim reception. The first frequency range may correspond to a start frequency and an end frequency.

In one configuration, the start frequency or the end frequency may include an absolute frequency or a frequency offset.

In one configuration, referring to FIG. 6, the IDC interference indication 606 may further include a victim mode associated with the at least one victim reception.

In one configuration, the victim mode may correspond to an active voice call mode, a connected mode, an idle mode, an IF mode, an IF neighbor mode, or an inter-RAT mode.

In one configuration, referring to FIG. 6, the IDC interference indication 606 may further include a priority associated with each victim reception in the at least one victim reception.

In one configuration, the priority associated with each victim reception in the at least one victim reception may be based on at least one of a level of interference, a throughput, or a victim mode.

In one configuration, at 806, the UE may perform NLIC for a first subset of the at least one victim reception. The at least one interference mitigation measure associated with the base station may correspond to a second subset of the at least one victim reception. The first subset of the at least one victim reception may be associated with one or more lower priorities than one or more victim receptions in the second subset of the at least one victim reception. For example, 806 may be performed by the IDC component 1040 in FIG. 10. Referring to FIG. 6, at 612, the UE 602 may perform NLIC for a first subset of the at least one victim reception.

In one configuration, referring to FIG. 6, the IDC interference indication 606 may include the information associated with the at least one aggressor transmission. The information associated with the at least one aggressor transmission may include a second frequency range associated with the at least one aggressor transmission.

In one configuration, the second frequency range may correspond to a start frequency and an end frequency.

In one configuration, the at least one interference mitigation measure may include at least one of a first RB allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

Figure 9:
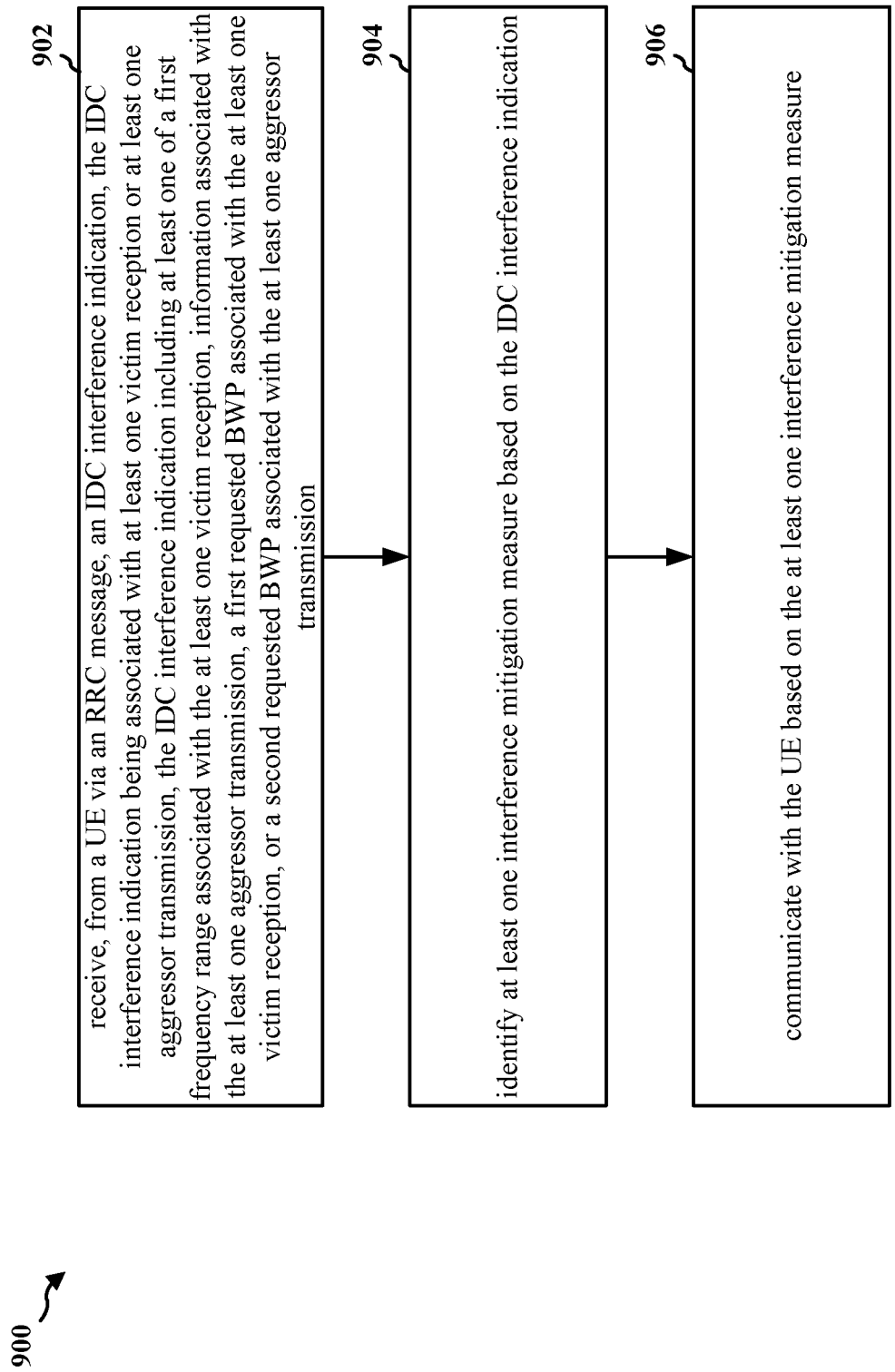
FIG. 9 is a flowchart of a method of wireless communication.

FIG. 9 is a flowchart 900 of a method of wireless communication. The method may be performed by a base station (e.g., the base station 102/180/310/604; the apparatus 1102). At 902, the base station may receive, from a UE via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. For example, 902 may be performed by the IDC component 1140 in FIG. 11. Referring to FIG. 6, at 606, the base station 604 may receive, from a UE 602 via an RRC message, an IDC interference indication.

At 904, the base station may identify at least one interference mitigation measure based on the IDC interference indication. For example, 904 may be performed by the IDC component 1140 in FIG. 11. Referring to FIG. 6, at 608, the base station 604 may identify at least one interference mitigation measure based on the IDC interference indication 606.

At 906, the base station may communicate with the UE based on the at least one interference mitigation measure. For example, 906 may be performed by the IDC component 1140 in FIG. 11. Referring to FIG. 6, at 610, the base station 604 may communicate with the UE 602 based on the at least one interference mitigation measure.

In one configuration, the at least one victim reception and the at least one aggressor transmission are associated with a same RAT.

In one configuration, the at least one victim reception and the at least one aggressor transmission are associated with different RATs.

In one configuration, referring to FIG. 6, the IDC interference indication 606 may include the first frequency range associated with the at least one victim reception. The first frequency range may correspond to a start frequency and an end frequency.

In one configuration, the start frequency or the end frequency may include an absolute frequency or a frequency offset.

In one configuration, referring to FIG. 6, the IDC interference indication 606 may further include a victim mode associated with the at least one victim reception.

In one configuration, the victim mode may correspond to an active voice call mode, a connected mode, an idle mode, an IF mode, an IF neighbor mode, or an inter-RAT mode.

In one configuration, referring to FIG. 6, the IDC interference indication 606 may further include a priority associated with each victim reception in the at least one victim reception.

In one configuration, the priority associated with each victim reception in the at least one victim reception may be based on at least one of a level of interference, a throughput, or a victim mode.

In one configuration, NLIC may be associated with a first subset of the at least one victim reception. The at least one interference mitigation measure may correspond to a second subset of the at least one victim reception. The first subset of the at least one victim reception may be associated with one or more lower priorities than one or more victim receptions in the second subset of the at least one victim reception.

In one configuration, referring to FIG. 6, the IDC interference indication 606 may include the information associated with the at least one aggressor transmission. The information associated with the at least one aggressor transmission may include a second frequency range associated with the at least one aggressor transmission.

In one configuration, the second frequency range may correspond to a start frequency and an end frequency.

In one configuration, the at least one interference mitigation measure may include at least one of a first RB allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

Figure 10:
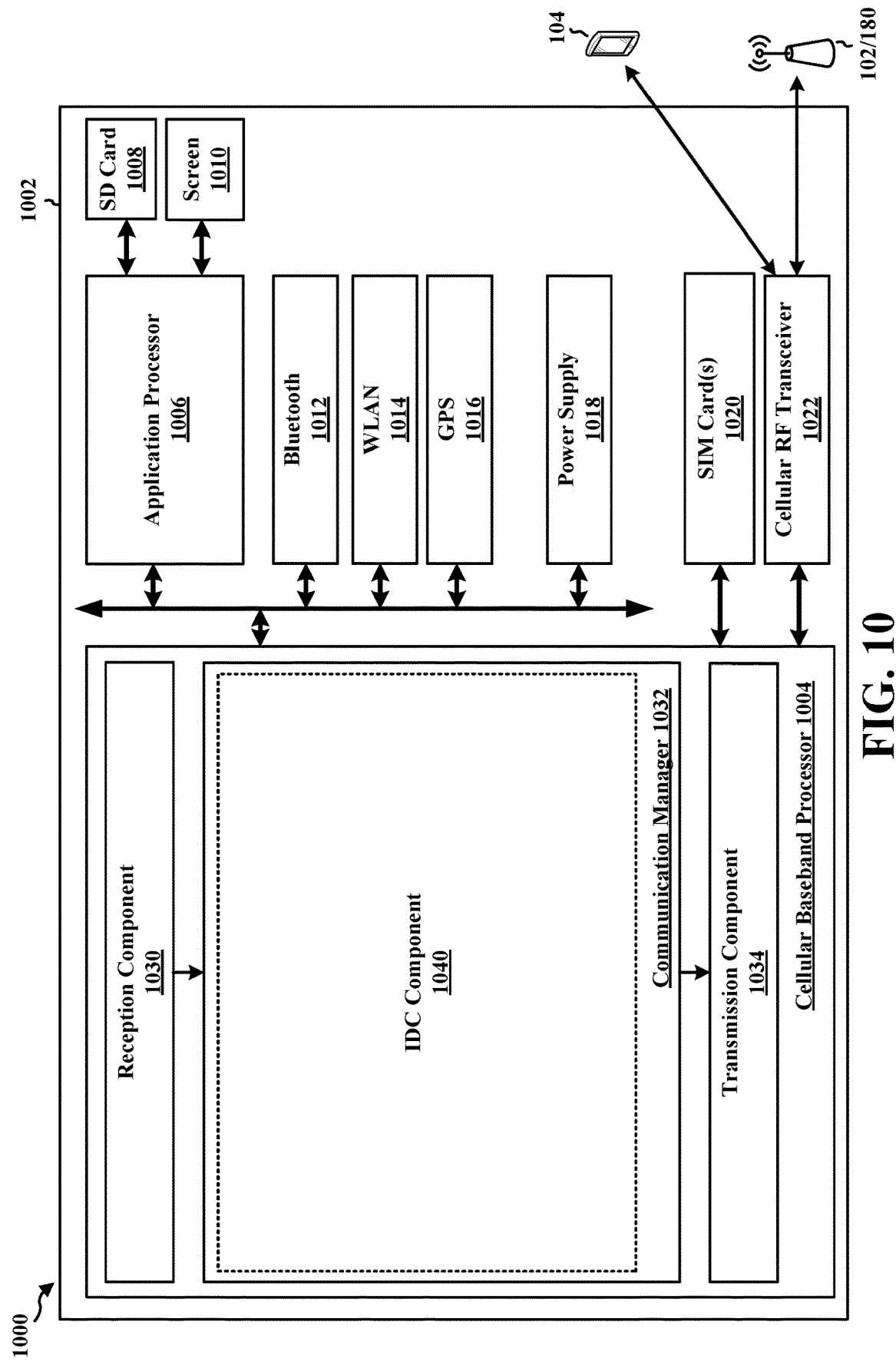
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes an IDC component 1040 that may be configured to transmit, to a base station via an RRC message, an IDC interference indication, e.g., as described in connection with 702 in FIGS. 7 and 802 in FIG. 8. The IDC component 1040 may be configured to communicate with the base station based on at least one interference mitigation measure associated with the base station, e.g., as described in connection with 704 in FIGS. 7 and 804 in FIG. 8. The IDC component 1040 may be configured to perform NLIC for a first subset of the at least one victim reception, e.g., as described in connection with 806 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for transmitting, to a base station via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. The apparatus 1002, and in particular the cellular baseband processor 1004, includes means for communicating with the base station based on at least one interference mitigation measure associated with the base station. The at least one interference mitigation measure may be based on the IDC interference indication.

In one configuration, the at least one victim reception and the at least one aggressor transmission may be associated with a same RAT. In one configuration, the at least one victim reception and the at least one aggressor transmission may be associated with different RATs. In one configuration, the IDC interference indication may include the first frequency range associated with the at least one victim reception. The first frequency range may correspond to a start frequency and an end frequency. In one configuration, the start frequency or the end frequency may include an absolute frequency or a frequency offset. In one configuration, the IDC interference indication may further include a victim mode associated with the at least one victim reception. In one configuration, the victim mode may correspond to an active voice call mode, a connected mode, an idle mode, an IF mode, an IF neighbor mode, or an inter-RAT mode. In one configuration, the IDC interference indication may further include a priority associated with each victim reception in the at least one victim reception. In one configuration, the priority associated with each victim reception in the at least one victim reception may be based on at least one of a level of interference, a throughput, or a victim mode. In one configuration, the apparatus 1002, and in particular the cellular baseband processor 1004, includes means for performing NLIC for a first subset of the at least one victim reception. The at least one interference mitigation measure associated with the base station may correspond to a second subset of the at least one victim reception. The first subset of the at least one victim reception may be associated with one or more lower priorities than one or more victim receptions in the second subset of the at least one victim reception. In one configuration, the IDC interference indication may include the information associated with the at least one aggressor transmission. The information associated with the at least one aggressor transmission may include a second frequency range associated with the at least one aggressor transmission. In one configuration, the second frequency range may correspond to a start frequency and an end frequency. In one configuration, the at least one interference mitigation measure may include at least one of a first RB allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 114. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes an IDC component 1140 that may be configured to receive, from a UE via an RRC message, an IDC interference indication, e.g., as described in connection with 902 in FIG. 9. The IDC component 1140 may be configured to identify at least one interference mitigation measure based on the IDC interference indication, e.g., as described in connection with 904 in FIG. 9. The IDC component 1140 may be configured to communicate with the UE based on the at least one interference mitigation measure, e.g., as described in connection with 906 in FIG. 9.

The apparatus may include additional components that perform each of the blocks of the algorithm in the flowcharts of FIGS. 6 and 9. As such, each block in the flowcharts of FIGS. 6 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for receiving, from a UE via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. The apparatus 1102, and in particular the baseband unit 1104, includes means for identifying at least one interference mitigation measure based on the IDC interference indication. The apparatus 1102, and in particular the baseband unit 1104, includes means for communicating with the UE based on the at least one interference mitigation measure.

In one configuration, the at least one victim reception and the at least one aggressor transmission are associated with a same RAT. In one configuration, the at least one victim reception and the at least one aggressor transmission are associated with different RATs. In one configuration, the IDC interference indication may include the first frequency range associated with the at least one victim reception. The first frequency range may correspond to a start frequency and an end frequency. In one configuration, the start frequency or the end frequency may include an absolute frequency or a frequency offset. In one configuration, the IDC interference indication may further include a victim mode associated with the at least one victim reception. In one configuration, the victim mode may correspond to an active voice call mode, a connected mode, an idle mode, an IF mode, an IF neighbor mode, or an inter-RAT mode. In one configuration, the IDC interference indication may further include a priority associated with each victim reception in the at least one victim reception. In one configuration, the priority associated with each victim reception in the at least one victim reception may be based on at least one of a level of interference, a throughput, or a victim mode. In one configuration, NLIC may be associated with a first subset of the at least one victim reception. The at least one interference mitigation measure may correspond to a second subset of the at least one victim reception. The first subset of the at least one victim reception may be associated with one or more lower priorities than one or more victim receptions in the second subset of the at least one victim reception. In one configuration, the IDC interference indication may include the information associated with the at least one aggressor transmission. The information associated with the at least one aggressor transmission may include a second frequency range associated with the at least one aggressor transmission. In one configuration, the second frequency range may correspond to a start frequency and an end frequency. In one configuration, the at least one interference mitigation measure may include at least one of a first RB allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-11, a UE may transmit to a base station, and the base station may receive from the UE, via an RRC message, an IDC interference indication. The IDC interference indication may be associated with at least one victim reception or at least one aggressor transmission. The IDC interference indication may include at least one of a first frequency range associated with the at least one victim reception, information associated with the at least one aggressor transmission, a first requested BWP associated with the at least one victim reception, or a second requested BWP associated with the at least one aggressor transmission. The base station may identify at least one interference mitigation measure based on the IDC interference indication. The UE and the base station may communicate based on the at least one interference mitigation measure. Accordingly, the network may effectively and efficiently provide assistance in self-interference mitigation to the UE, even when increased carrier bandwidths are used in later technologies.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to transmit, to a base station via an RRC message, an IDC interference indication, the IDC interference indication being associated with at least one victim reception or at least one aggressor transmission, the IDC interference indication including at least one of a first frequency range associated with the at least one victim reception, information associated with the at least one aggressor transmission, a first requested BWP associated with the at least one victim reception, or a second requested BWP associated with the at least one aggressor transmission; and communicate with the base station based on at least one interference mitigation measure associated with the base station, the at least one interference mitigation measure being based on the IDC interference indication.

Aspect 2 is the apparatus of aspect 1, where the at least one victim reception and the at least one aggressor transmission are associated with a same RAT.

Aspect 3 is the apparatus of aspect 1, where the at least one victim reception and the at least one aggressor transmission are associated with different RATs.

Aspect 4 is the apparatus of aspect any of aspects 1 to 3, where the IDC interference indication includes the first frequency range associated with the at least one victim reception, and the first frequency range corresponds to a start frequency and an end frequency.

Aspect 5 is the apparatus of aspect 4, where the start frequency or the end frequency includes an absolute frequency or a frequency offset.

Aspect 6 is the apparatus of any of aspects 1 to 6, where the IDC interference indication further includes a victim mode associated with the at least one victim reception.

Aspect 7 is the apparatus of aspect 6, where the victim mode corresponds to an active voice call mode, a connected mode, an idle mode, an IF mode, an IF neighbor mode, or an inter-RAT mode.

Aspect 8 is the apparatus of any of aspects 1 to 7, where the IDC interference indication further includes a priority associated with each victim reception in the at least one victim reception.

Aspect 9 is the apparatus of aspect 8, where the priority associated with each victim reception in the at least one victim reception is based on at least one of a level of interference, a throughput, or a victim mode.

Aspect 10 is the apparatus of any of aspects 8 and 9, where the at least one processor is further configured to perform NLIC for a first subset of the at least one victim reception, the at least one interference mitigation measure associated with the base station corresponds to a second subset of the at least one victim reception, and the first subset of the at least one victim reception is associated with one or more lower priorities than one or more victim receptions in the second subset of the at least one victim reception.

Aspect 11 is the apparatus of any of aspects 1 to 10, where the IDC interference indication includes the information associated with the at least one aggressor transmission, and the information associated with the at least one aggressor transmission includes a second frequency range associated with the at least one aggressor transmission.

Aspect 12 is the apparatus of aspect 11, where the second frequency range corresponds to a start frequency and an end frequency.

Aspect 13 is the apparatus of any of aspects 1 to 12, where the at least one interference mitigation measure includes at least one of a first RB allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

Aspect 14 is the apparatus of any of aspects 1 to 13, further including a transceiver coupled to the at least one processor.

Aspect 15 is an apparatus for wireless communication at a base station including at least one processor coupled to a memory and configured to receive, from a UE via an RRC message, an IDC interference indication, the IDC interference indication being associated with at least one victim reception or at least one aggressor transmission, the IDC interference indication including at least one of a first frequency range associated with the at least one victim reception, information associated with the at least one aggressor transmission, a first requested BWP associated with the at least one victim reception, or a second requested BWP associated with the at least one aggressor transmission; identify at least one interference mitigation measure based on the IDC interference indication; and communicate with the UE based on the at least one interference mitigation measure.

Aspect 16 is the apparatus of aspect 15, where the at least one victim reception and the at least one aggressor transmission are associated with a same RAT.

Aspect 17 is the apparatus of aspect 15, where the at least one victim reception and the at least one aggressor transmission are associated with different RATs.

Aspect 18 is the apparatus of any of aspects 15 to 17, where the IDC interference indication includes the first frequency range associated with the at least one victim reception, and the first frequency range corresponds to a start frequency and an end frequency.

Aspect 19 is the apparatus of aspect 18, where the start frequency or the end frequency includes an absolute frequency or a frequency offset.

Aspect 20 is the apparatus of any of aspects 15 to 19, where the IDC interference indication further includes a victim mode associated with the at least one victim reception.

Aspect 21 is the apparatus of aspect 20, where the victim mode corresponds to an active voice call mode, a connected mode, an idle mode, an IF mode, an IF neighbor mode, or an inter-RAT mode.

Aspect 22 is the apparatus of any of aspects 15 to 21, where the IDC interference indication further includes a priority associated with each victim reception in the at least one victim reception.

Aspect 23 is the apparatus of aspect 22, where the priority associated with each victim reception in the at least one victim reception is based on at least one of a level of interference, a throughput, or a victim mode.

Aspect 24 is the apparatus of any of aspects 22 and 23, where NLIC is associated with a first subset of the at least one victim reception, the at least one interference mitigation measure corresponds to a second subset of the at least one victim reception, and the first subset of the at least one victim reception is associated with one or more lower priorities than one or more victim receptions in the second subset of the at least one victim reception.

Aspect 25 is the apparatus of any of aspects 15 to 24, where the IDC interference indication includes the information associated with the at least one aggressor transmission, and the information associated with the at least one aggressor transmission includes a second frequency range associated with the at least one aggressor transmission.

Aspect 26 is the apparatus of aspect 25, where the second frequency range corresponds to a start frequency and an end frequency.

Aspect 27 is the apparatus of any of aspects 15 to 26, where the at least one interference mitigation measure includes at least one of a first RB allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

Aspect 28 is the apparatus of any of aspects 15 to 27, further including a transceiver coupled to the at least one processor.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication, comprising:
   a memory; and
   at least one processor coupled to the memory, wherein the at least one processor is configured to:
   transmit, to a base station via a radio resource control (RRC) message, an in-device coexistence (IDC) interference indication associated with interference experienced by the apparatus on a first frequency range, the IDC interference indication being associated with at least one victim reception or at least one aggressor transmission, wherein the IDC interference indication comprises an absolute radio frequency channel number (ARFCN) value, an offset from the ARFCN value, and a priority associated with each victim reception of the at least one victim reception, and wherein the offset is indicative of the first frequency range;
   perform non-linear interference cancellation (NLIC) for a first subset of the at least one victim reception, wherein at least one interference mitigation measure associated with the base station corresponds to a second subset of the at least one victim reception, and wherein the first subset of the at least one victim reception is associated with one or more lower priorities than one or more victim receptions of the second subset of the at least one victim reception; and
   communicate with the base station based on the apparatus not being able to mitigate the interference experienced on the first frequency range.

2. The apparatus of claim 1, wherein the at least one victim reception and the at least one aggressor transmission are associated with a same radio access technology (RAT).

3. The apparatus of claim 1, wherein the at least one victim reception and the at least one aggressor transmission are associated with different radio access technologies (RATs).

4. The apparatus of claim 1, wherein the IDC interference indication is indicative of a starting frequency and an ending frequency for the first frequency range.

5. The apparatus of claim 4, wherein the starting frequency or the ending frequency comprises an absolute frequency or a frequency offset.

6. The apparatus of claim 1, wherein the IDC interference indication further comprises a victim mode associated with the at least one victim reception.

7. The apparatus of claim 6, wherein the victim mode corresponds to an active voice call mode, a connected mode, an idle mode, an inter-frequency (IF) mode, an IF neighbor mode, or an inter-radio access technology (RAT) mode.

8. The apparatus of claim 1, wherein the priority associated with each victim reception in the at least one victim reception is based on at least one of a level of interference, a throughput, or a victim mode.

9. The apparatus of claim 1, wherein the IDC interference indication comprises information associated with the at least one aggressor transmission, and the information associated with the at least one aggressor transmission includes a second frequency range associated with the at least one aggressor transmission.

10. The apparatus of claim 9, wherein the second frequency range is indicated with a frequency start and a frequency end.

11. The apparatus of claim 1, wherein at least one interference mitigation measure associated with the base station includes at least one of a first resource block (RB) allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

12. The apparatus of claim 1, further comprising a transceiver coupled to the at least one processor.

13. A method of wireless communication performed by a user equipment (UE), comprising:
   transmitting, to a base station via a radio resource control (RRC) message, an in-device coexistence (IDC) interference indication associated with interference experienced by the UE on a first frequency range, the IDC interference indication being associated with at least one victim reception or at least one aggressor transmission, wherein the IDC interference indication comprises an absolute radio frequency channel number (ARFCN) value, an offset from the ARFCN value, and a priority associated with each victim reception of the at least one victim reception, and wherein the offset is indicative of the first frequency range;
   performing non-linear interference cancellation (NLIC) for a first subset of the at least one victim reception, wherein at least one interference mitigation measure associated with the base station corresponds to a second subset of the at least one victim reception, and wherein the first subset of the at least one victim reception is associated with one or more lower priorities than one or more victim receptions of the second subset of the at least one victim reception; and
   communicating with the base station based on the UE not being able to mitigate the interference experienced on the first frequency range.

14. An apparatus for wireless communication, comprising:
a memory; and
at least one processor coupled to the memory, wherein the at least one processor is configured to:
receive, from a user equipment (UE) via a radio resource control (RRC) message, an in-device coexistence (IDC) interference indication associated with interference experienced by the UE on a first frequency range, the IDC interference indication being associated with at least one victim reception or at least one aggressor transmission, wherein the IDC interference indication comprises an absolute radio frequency channel number (ARFCN) value, an offset from the ARFCN value, and a priority associated with each victim reception of the at least one victim reception, wherein the offset is indicative of the first frequency range, wherein non-linear interference cancellation (NLIC) is associated with a first subset of the at least one victim reception, wherein at least one interference mitigation measure associated with the apparatus corresponds to a second subset of the at least one victim reception, and wherein the first subset of the at least one victim reception is associated with one or more lower priorities than one or more victim receptions of the second subset of the at least one victim reception; and
communicate with the UE based on the UE not being able to mitigate the interference experienced on the first frequency range.

15. The apparatus of claim 14, wherein the at least one victim reception and the at least one aggressor transmission are associated with a same radio access technology (RAT).

16. The apparatus of claim 14, wherein the at least one victim reception and the at least one aggressor transmission are associated with different radio access technologies (RATs).

17. The apparatus of claim 14, wherein the IDC interference indication is indicative of a starting frequency and an ending frequency for the first frequency range.

18. The apparatus of claim 17, wherein the starting frequency or the ending frequency comprises an absolute frequency or a frequency offset.

19. The apparatus of claim 14, wherein the IDC interference indication further comprises a victim mode associated with the at least one victim reception.

20. The apparatus of claim 19, wherein the victim mode corresponds to an active voice call mode, a connected mode, an idle mode, an inter-frequency (IF) mode, an IF neighbor mode, or an inter-radio access technology (RAT) mode.

21. The apparatus of claim 14, wherein the priority associated with each victim reception in the at least one victim reception is based on at least one of a level of interference, a throughput, or a victim mode.

22. The apparatus of claim 14, wherein the IDC interference indication comprises information associated with the at least one aggressor transmission, and the information associated with the at least one aggressor transmission includes a second frequency range associated with the at least one aggressor transmission.

23. The apparatus of claim 22, wherein the second frequency range is indicated with a frequency start and a frequency end.

24. The apparatus of claim 14, wherein at least one interference mitigation measure associated with the apparatus includes at least one of a first resource block (RB) allocation associated with the at least one victim reception, a second RB allocation associated with the at least one aggressor transmission, a first BWP activation associated with the at least one victim reception, a second BWP activation associated with the at least one aggressor transmission, first BWP switching associated with the at least one victim reception based on a first pattern, second BWP switching associated with the at least one aggressor transmission based on a second pattern, or an addition of a supplemental uplink associated with the at least one aggressor transmission.

25. The apparatus of claim 14, further comprising a transceiver coupled to the at least one processor.

26. A method of wireless communication performed by a base station, comprising:
receiving, from a user equipment (UE) via a radio resource control (RRC) message, an in-device coexistence (IDC) interference indication associated with interference experienced by the UE on a first frequency range, the IDC interference indication being associated with at least one victim reception or at least one aggressor transmission, wherein the IDC interference indication comprises an absolute radio frequency channel number (ARFCN) value, an offset from the ARFCN value, and a priority associated with each victim reception of the at least one victim reception, wherein the offset is indicative of the first frequency range, wherein non-linear interference cancellation (NLIC) is associated with a first subset of the at least one victim reception, wherein at least one interference mitigation measure associated with the base station corresponds to a second subset of the at least one victim reception, and wherein the first subset of the at least one victim reception is associated with one or more lower priorities than one or more victim receptions of the second subset of the at least one victim reception; and
communicating with the UE based on the UE not being able to mitigate the interference experienced on the first frequency range.

* * * * *